Feb. 27, 1968   W. H. HULTGREN ET AL   3,370,708
DUAL ELEMENT, DUAL VALVE, TWIST-ON TYPE FILTER ASSEMBLY
Filed March 16, 1966   2 Sheets-Sheet 1

INVENTORS
William H. Hultgren
Robert Lee Hall

BY Lawrence J. Winter
ATTORNEY

United States Patent Office 3,370,708
Patented Feb. 27, 1968

3,370,708
DUAL ELEMENT, DUAL VALVE, TWIST-ON
TYPE FILTER ASSEMBLY
William H. Hultgren and Robert Lee Hall, Mount Carmel,
Ill., assignors to Champion Laboratories, Inc., West
Salem, Ill., a corporation of Connecticut
Filed Mar. 16, 1966, Ser. No. 541,441
4 Claims. (Cl. 210—130)

ABSTRACT OF THE DISCLOSURE

A filter unit having at least two spaced, concentric filter elements providing an inlet passageway therebetween, the inner element surrounding a central perforated tube which forms an outlet passageway, end caps sealing the opposite ends of said elements, inlet holes in one end cap, a valve closing an opening in the other end cap leading to the central passageway wherein the outer filter element is utilized upon cold starting and upon clogging of the inner filter element. The two filter elements provide a duplex filter device, as distinguished from the usual parallel flow of two filter elements in the same filter housing. The filter unit further provides one filter element that prolongs the life of the complete filter unit by adding effective area to the filtering of the liquid toward the end of the service life of the inner concentric filter element and a relief valve bypassing both filter elements.

---

The present invention relates to oil filter units of the throwaway type in which the filter cartridge is permanently sealed or secured within the filter casing or shell, and more particularly to a filter unit of the throwaway type which can be easily and quickly screwed into its operating position.

It is an object of the present invention to provide a spin-on throwaway type oil filter that is provided with a maximum amount of filtering surface or space within the casing housing the filter cartridge.

It is another object of the present invention to provide a spin-on type oil filter unit that is readily adaptable to replace spin-on type oil filters now in operation without requiring alteration of the internal combustion engines upon which they are used.

It is yet another object of the present invention to provide a spin-on type oil filter unit comprising a casing or shell that can be utilized to house the conventional spin-on type oil filter in present-day use, and which housing can receive the novel oil filter cartridge of the present invention embodying a maximum amount of filtering surface, as compared with the conventional spin-on type throwaway filters used heretofore.

It is another object of the present invention to provide a spin-on type oil filter unit that is provided with spaced concentric oil filter cartridges with one cartridge disposed within the other so that the oil to be filtered passes between the oil filter cartridges and flows in an outside-in direction and in an inside-out direction to be filtered.

It is another object of the present invention to provide an oil filter unit of a spin-on type that has an oil filter cartridge consisting of two separate filters comprising an inner filter cartridge and an outer filter cartridge that are formed integral and comprise a single member.

It is another object of the present invention to provide a spin-on type oil filter that can be readily housed within a conventional spin-on type oil filter unit in present day use that has a bypass valve and an antidrainback valve therein, and which is provided with a concentric oil filter cartridge that can be readily supported on the usual filter support means now used in present-day spin-on type oil filters.

It is another object of the present invention to provide a throwaway type oil filter that is provided with two separate oil filter cartridges made of a pleated annulus with a common inlet passage or upstream oil flow passage and with the flow of oil after it passes through the upstream passage being diverted or diverging in opposite or different directions so that the oil flows through the two separate oil filter cartridges for proper filtration and cleaning of the contaminants in the oil.

It is another object of the present invention to provide an oil filter of the spin-on throwaway type that consists of two concentrically disposed pleated oil filter cartridges disposed in parallel flow relationship with the discharge side of the oil filter cartridges being in a common flow path relationship.

It is another object of the present invention to provide a spin-on type throwaway oil filter that is provided with concentric filter cartridges therein with a means for controlling the flow of oil from the discharge side of one of the oil filter cartridges.

It is yet another object of the present invention to provide a throwaway type filter unit in which the filter casing is provided with two concentrically disposed filter cartridges therein arranged for parallel flow of oil therethrough with means for restricting or controlling the flow of oil from one of the filter cartridges comprising valve means.

It is yet another object of the present invention to provide a spin-on type throwaway filter unit in which the filter housing is provided with two concentrically disposed filter elements or cartridges which elements are disposed in parallel flow relationship, and in which an inner valve means is disposed inwardly of the two filter elements and downstream of one of the filter elements so as to control the flow of liquid therethrough.

It is another object of the present invention to provide a spin-on type filter unit having concentric filter elements and bypass valve means in which the bypass valve means is set to be opened at a predetermined differential pressure across the filter elements, and in which an inner valve means is disposed downstream of one of the filter elements and in series relationship therewith, and in which this particular valve means is set to open at a differential pressure across the filter element with which it is disposed in series relationship, and which differential pressure setting is different from the differential pressure setting for said bypass valve means.

It is another object of the present invention to provide a spin-on type throwaway oil filter having concentric filter elements therein in which bypass means are provided for bypassing both filter elements, and in which the outer filter element is provided with a valve means in series flow relationship therewith on the downstream side thereof, and in which the bypass valve means is set for approximately twice the differential pressure across the filter unit, as the differential pressure setting for the valve means disposed downstream of the outer concentric filter element, so that upon cold starting of the engine with cold oil, the outer element will be used as a standby for the period where the engine is warming up, and the inner filter element will permit oil to flow therethrough.

It is another object of the present invention to provide a duplex filter unit wherein the porosity of the concentric filter elements is substantially the same, and wherein the outer filter element is used as a standby for the initial period where an engine is warming up, and the inner concentric filter element cannot handle the flow of cold oil, or in the end of the effective dirt life of the inner element, the outer concentric element will kick in when the differential pressure exceeds the differential pressure setting for the valve means disposed in series relationship with the outer filter element, due to the dirt loading of the inner element and thereby prolongs the life of the complete spin-on filter unit by adding effective area when it is needed towards the end of the service life of the inner concentric filter element.

It is yet another object of the present invention to provide a filter unit having two concentric filter elements with an inner valve means disposed on the top of the unit and which valve means is set for a differential pressure of about 50% of the opening pressure of the valve means of the complete unit bypass valve, so that when the restriction across the filter unit exceeds the predetermined differential pressure setting of the bypass valve, both concentric filter elements will bypass. The invention further comprises the setting of the inner valve on top of the filter element that is disposed in series relationship with the outer filter element so that the differential pressure across the interior element will be less than the differential pressure across the outer concentric element, and will permit flow through the inner element while flow through the outer element will not begin until a differential pressure setting across the valve on top of the element is exceeded, which differential pressure is set so that the oil will flow first through the inner element, and the outer element will act as a standby element for a period where the engine is warming up.

Various other objects and advantages of the present invention will be readily apparent from the following detailed description when considered in connection with the accompanying drawings forming a part hereof and in which.

Figure 1:
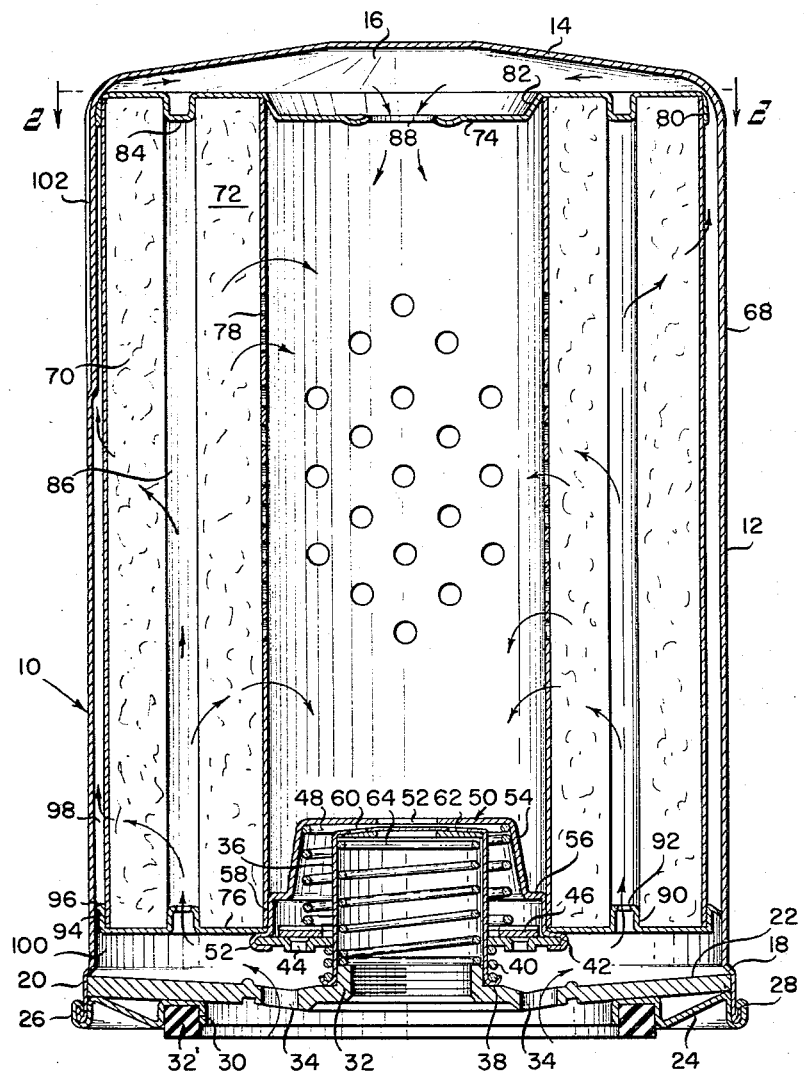
FIGURE 1 is a side elevational view in section illustrating the oil filter embodied in the present invention.
Figure 2:
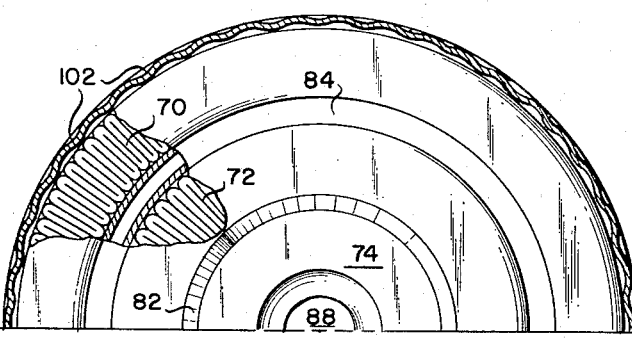
FIGURE 2 is a section taken along line 2—2 of FIG. 1.

Referring to the drawings, the reference numeral 10 generally designates an oil filter unit provided with a cylindrical housing or casing 12 that is closed at one end 14 and is open at its other end. The end 14 is dome shaped so as to provide an oil discharge passage or chamber 16 therein.

The open end of the housing 12 is provided with an outwardly flared rim 18 that extends vertically downwardly at 20. The open end of the filter shell or casing is closed off by a relatively thick reinforcement plate 22 which has its outer circumference or periphery disposed within the portion 20 of the housing and is kept from moving upwardly in the housing by the flared rim 18.

The reinforcement plate 22 is held within the inner open end of the shell 12 by an annular retainer plate 24 that is provided with a lip 26 that is bent over a corresponding lip 28 on the casing or shell 12 so as to form a rolled seam therewith. The retainer plate 24 is tack welded or secured by any other suitable means to the outer surface of the reinforcement plate 22. The inner circumference of the retainer plate 24 is provided with an annular rib forming a recess 30 therein for receiving a ring gasket 32′ for providing a seal with the engine block upon which the oil filter unit is disposed when in operation.

The reinforcement plate 22 is provided with a central inturned threaded nipple 32. The nipple 32 has a plurality of oil inlet ports or openings 34 disposed therearound for receiving contaminated oil into the housing for cleaning thereof.

An inner sleeve member 36 is disposed around the nipple 32 within the filter housing and has an annular outwardly turned lip 38 disposed adjacent the reinforcement plate 22 so as to receive a biasing spring 40 therein. The biasing spring 40 has its other end bearing against an annular plate member 42 which acts as a filter cartridge support. The annular plate member 42 is provided with a plurality of circumferentially spaced oil bypass ports 44. An annular bypass valve ring 46 is disposed over the ports 44 and is normally urged into a seated position by its biasing spring 48. The biasing spring 48 has its inner end bearing against an outer sleeve member 50 which has a lip 52 securing it to the annular plate member 42. The outer sleeve 50 is provided with a central opening 52 for receiving the discharge from the oil filter cartridges disposed in the housing and has an outwardly inclined wall 54 with a horizontal portion 56 and a vertical portion 58 adjacent the lip 52 of the sleeve 50. The filter cartridge seats on the lip 52 and is radially spaced by the vertical portion 58 of the sleeve, as hereinafter described.

The inner sleeve 36 is provided with a plurality of oil outlet ports 60 circumferentially disposed around the top of the sleeve. An antidrainback valve consisting of an annular valve disc 62 is mounted within the sleeve 36 so as to cover off or close the oil outlet ports 60 and the antidrainback valve disc is normally urged into a seated position by the biasing spring 64 disposed within the sleeve 36 and seating against the nipple 32.

The oil filter unit of the present invention is provided with a concentric filter element unit generally designated 68 and comprising an outer resin impregnated pleated filter paper element 70 and a similar inner pleated paper filter element 72. The opposite ends of the pleated filter element 70 and 72 are sealed off by end caps 74 and 76. A perforated center tube 78 is disposed inwardly of the inner pleated element 72. The end cap 74 is provided with downwardly turned outer rims 80 and 82 which position the two filter elements 70 and 72 laterally. The two elements are spaced or separated from each other by a downturned or inturned annular rib 84 providing an oil discharge passage or channel 86 between the filter elements. The portion of the end cap inwardly of the inturned rim 82 is provided with an opening 88 therein for controlling the flow of oil from the outer filter element 70.

The end cap 76 which seats upon the lip 52 is also provided with an inturned or upturned rib 90 having a plurality of circumferentially spaced oil inlet openings 92 therein so as to permit incoming oil to flow into the passage 86. It will be noted that the end cap 76 is provided with inturned rims 94 adjacent the outer side edges of the outer filter element 70 and the rim 94 terminates in an outwardly inclined flange or rim 96. This rim or lip 96 prevents the oil from flowing upwardly in the housing into the annular chamber 98 provided between the outer end of the outer element 70 and the inner surface of the casing 12. Thus, any oil entering the housing through the openings 34 will pass into the chamber 100 disposed below the filter cartridges and into the openings 92 and into the passage or annular chamber 86 between the filter cartridges.

Figure 3:
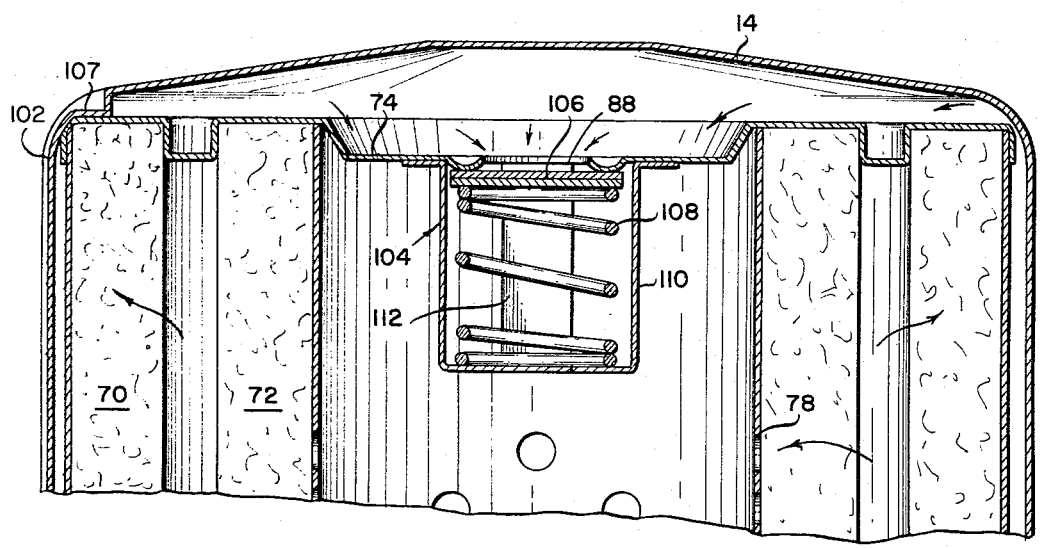
FIGURE 3 is an enlarged view of a modification of the embodiment shown in FIG. 1.

The upper portion of the housing 12 is provided with a plurality of circumferentially spaced indentations or longitudinal ribs 102 therein as best shown in FIGURE 3. The upper portion of the longitudinal ribs 102 forms an L-shaped configuration or seat 107 which spaces the upper end of the concentric filter element unit away from the inner surface of the housing 12 so that the oil being passed through the housing can flow up and around the outer edge of the filter element unit and into the oil discharge chamber 16 so as to pass downwardly through the center tube of the unit.

In operation, oil from an internal combustion engine, for example, is passed into the filter unit through the oil inlet openings 34 and flows through the chamber 100 and through the openings 92 into the annular passage 86 between the filter cartridges 70 and 72. Thereafter, the oil passes through the cartridge 70 in an inside-out direction so as to remove the contaminants and dirt from the oil. The oil thereafter passes through the chamber 98 and between the longitudinal ribs 102 and over the top of the element into the chamber 16, after which it flows through the opening 88 downwardly into the center tube.

Another portion of the oil that has passed into the inlet chamber 86 flows in an outside-in direction through the inside filter element 72 to remove dirt and contaminants therefrom, and is discharged into the center tube 78. Thereafter, the oil unseats the antidrainback valve disc 62 and flows through the sleeve 36 and nipple 32 back into the internal combustion engine, not shown, and out of the filter housing. The amount of oil that passes through the outer filter element 70 can be controlled or metered by the size or the number of the opening 88 in the end cap 74.

Thus, the flow of oil through the outer filter element can be regulated to a predetermined quantity. Should the filter elements become clogged for any reason the oil will completely bypass the cartridges and flow through the bypass ports 44 and the sleeve 50 to completely short circuit flow through the filter housing. The bypassed oil flows through sleeve 50, and into ports 60, and flows out of sleeve 36 and nipple 32 back into the engine.

Thus, with the present invention a spin-on type throwaway filter element is provided with a maximum amount of filtration surface utilizing two pleated paper filter elements of the same porosity, one disposed within the other, in a spin-on type filter. The spin-on type filter of the present invention can thus produce a greater amount of filtration per given area than the spin-on type filters utilized heretofore, or in other words, a concentric spin-on filter is provided with extra surface area by placing both filter elements in parallel flow.

With reference to the embodiment of the invention shown in FIGURE 3, this is similar to the embodiment shown in FIGURE 1, except that the end cap 74 is provided with a valve 104 disposed over the opening 88. The valve 104 consists of a valve disc 106 normally urged into a seated position over the opening 88 by a biasing spring 108 mounted in the cup member 110, which cup member has longitudinal slots 112 in the sides thereof for discharging the oil into the center tube 78. Thus this embodiment of the invention provides a duplex flow or a dual volume filter unit with concentric elements and a valve member disposed on the downstream side of the outer concentric filter element.

Referring to the invention shown in FIGURE 3, the valve 104 is set for a differential pressure of about 50% of the opening pressure of the bypass valve 46 of the complete filter unit. For example, the bypass valve 46 may be set for 8 pounds differential pressure, so that when the restriction across the filter unit exceeds this, both filter elements 70 and 72 will bypass. The valve 106 disposed on top of the filter unit and in series relationship with the outer concentric element 70, will be set for approximately 4 pounds differential pressure so that the outer element 70 of the two concentric elements will flow only when the differential pressure across the interior element 72 exceeds 4 pounds, and this will occur, for example, upon cold starts of the engine with cold oil. This will give the inner filter element 72 a boost in effective filtering area in preventing the filter element bypass valve 46 from opening at all unless both filter elements 70 and 72 are completely clogged.

Thus, the present invention provides a duplex filtering unit where the outer element 70 is used as a standby for the time during which the engine is warming up, and the inner element 72 cannot handle the flow of cold oil, or in the end of the effective service or dirt life of the inner element 72, the outer element 70 will permit oil to pass therethrough, or will kick in, when the differential pressure reaches 4 pounds per square inch, due to the dirt loading upon the inner element 72, and thereby prolongs the life of the complete spin-on type filter unit, by adding effective filtering area when it is needed toward the end of the service life of the inner filter element 72.

Inasmuch as various changes may be made in the arrangement and location of the several parts, it is not meant to limit the invention except by the scope of the following claims.

What is claimed is:
1. An oil filter comprising a screw or throwaway type, cylindrical housing open at one end, a closure plate secured to said housing with a central nipple forming an oil outlet, oil inlet means in said closure plate, filter element support means carried by said nipple, a filter member immovable during filtering operation seated on said filter support means comprising at least two concentric filter elements with one element spaced inwardly of the other to form a flow passage therebetween, the outer element being spaced from the inner surface of said housing to provide an annular discharge chamber for said outer element, end caps sealing off the opposite ends of said filter elements, one of said end caps adjacent said support means having an annular portion between said filter elements having oil inlet ports therein in communication with said closure plate oil inlet means, flow preventing means on said one end cap to prevent flow around the bottom of said outer element, a perforated center tube disposed inwardly of said inner element to receive liquid discharged from said elements, an inner valve means disposed in the other end cap in the center tube in series flow relationship with said outer filter element and said center tube, bypass valve means adjacent the bottom end of said center tube between said inlet and outlet for bypassing liquid around said filter elements when a predetermined differential pressure across said filter elements is exceeded, said inner valve means being set to open at a predetermined differential pressure value of substantially less value than the predetermined pressure differential value at which said bypass valve is set to open.

2. The oil filter of claim 1 wherein elongated circumferentially spaced indentations are provided in said housing in the end thereof opposite said closure plate, to provide flow paths around the top of said filter elements.

3. The liquid filter unit of claim 1 wherein said inlet valve means has a setting of about 50% of the value of the opening pressure of said bypass valve means.

4. The liquid filter unit of claim 1 wherein said filter elements are made of filter paper having substantially the same porosity.

References Cited
UNITED STATES PATENTS

| | | | |
|---|---|---|---|
| 2,387,368 | 10/1945 | Vokes | 210—131 |
| 2,877,902 | 3/1959 | Chase et al. | 210—440 |
| 3,184,062 | 5/1965 | Humbert | 210—130 |
| 3,211,292 | 10/1965 | Bull | 210—342 |
| 3,232,437 | 2/1966 | Hultgren | 210—440 |
| 3,283,904 | 11/1966 | Buckman et al. | 210—314 X |

REUBEN FRIEDMAN, *Primary Examiner.*

F. SPEAR, *Assistant Examiner.*